US007954006B1

United States Patent
Mangipudi

(10) Patent No.: US 7,954,006 B1
(45) Date of Patent: May 31, 2011

(54) METHOD AND APPARATUS FOR ARCHIVING DATA DURING UNEXPECTED POWER LOSS

(75) Inventor: Prasad Mangipudi, Cupertino, CA (US)

(73) Assignee: PMC-Sierra, Inc., Burnaby, BC (CA)

( * ) Notice: Subject to any disclaimer, the term of this patent is extended or adjusted under 35 U.S.C. 154(b) by 238 days.

(21) Appl. No.: 12/326,845

(22) Filed: Dec. 2, 2008

(51) Int. Cl.
*G06F 11/00* (2006.01)
(52) U.S. Cl. .............................. 714/22; 714/5; 713/340
(58) Field of Classification Search ................ 714/5, 22; 713/340
See application file for complete search history.

(56) References Cited

U.S. PATENT DOCUMENTS

| | | | | |
|---|---|---|---|---|
| 6,496,939 | B2* | 12/2002 | Portman et al. ............... | 713/340 |
| 7,003,620 | B2* | 2/2006 | Avraham et al. .............. | 711/103 |
| 7,392,429 | B2* | 6/2008 | Frank et al. .................. | 714/24 |
| 7,487,391 | B2* | 2/2009 | Pecone et al. ................. | 714/14 |
| 2004/0103238 | A1* | 5/2004 | Avraham et al. .............. | 711/102 |
| 2006/0015683 | A1* | 1/2006 | Ashmore et al. .............. | 711/113 |
| 2006/0139069 | A1* | 6/2006 | Frank et al. .................. | 327/143 |
| 2007/0033433 | A1* | 2/2007 | Pecone et al. ................. | 714/6 |
| 2008/0215808 | A1* | 9/2008 | Ashmore et al. .............. | 711/113 |

* cited by examiner

*Primary Examiner* — Robert Beausoliel
*Assistant Examiner* — Charles Ehne
(74) *Attorney, Agent, or Firm* — Martine Penilla & Gencarella, LLP

(57) ABSTRACT

A method and system for preventing loss of data in a computer interface board during power failure includes providing a secondary data path to a non-volatile storage element from a cache memory of the computer interface board. Components in the secondary data path, such as the cache memory and non-volatile storage element, are powered by a secondary power supply. The cache memory of the computer interface board is a volatile memory. The secondary data path with the non-volatile storage element enables reliable memory operation during both normal and power fail modes. A power failure at the computer interface board is detected. The power failure may result in incomplete transactional data within the cache memory. Upon detection of power failure, the incomplete transactional data at the cache memory is transmitted to the non-volatile storage element through the secondary data path using the power from the secondary power supply. The non-volatile storage element preserves the transactional data of the cache memory during power failure.

20 Claims, 6 Drawing Sheets

METHOD AND APPARATUS FOR ARCHIVING DATA DURING UNEXPECTED POWER LOSS

BACKGROUND OF THE INVENTION

1. Field of the Invention

The present invention relates generally to securing transactional data and, more particularly, to securing transactional data without the use of chemical battery cells by using a secondary data path.

2. Description of the Related Art

A host computer executes a plurality of applications, such as banking software, database software, or any other data changing application. An application running on the host computer processes various types of data, including highly sensitive data. The transactional data from the host application is processed using cache memory and after successful processing is permanently stored on disk or tape. When a host application shuts down normally, the transactional data associated with the application is completely processed and is moved from the cache memory to permanent storage before the application actually shuts down. As a result, there is no incomplete data in cache memory that still needs to be processed. If, however, an unexpected power failure occurs during execution of a host application, the host application might not have the opportunity to completely process the data and move the data to permanent storage. Instead, there might be incomplete transactional data still left in the cache memory. In order to not lose any transactional data from a host application, conventional architecture place the cache memory devices in a low-power operational state called 'self-refresh' mode. During this phase, the cache memory devices are powered using a chemical cell to protect the data in the cache memory until power is restored to the system.

The usage of chemical cells has its own disadvantages and limitations. For one, a chemical cell has limited shelf life and needs to be monitored periodically and replaced when the cell's useful life has expired. In order to replace the chemical cell, the whole system needs to be shut down and the chemical cell replaced. This would result in considerable down time of the system, which would be inconvenient and undesirable. Further, chemical cells need to be properly handled and disposed leading to additional costs and undesirable overhead.

It would, therefore, be desirable to find an alternate solution of preserving the transactional data without having to periodically monitor and maintain the chemical cell.

It is in this context that embodiments of the invention arise.

SUMMARY OF THE INVENTION

Broadly speaking, the present invention fills these needs by providing an alternate data path to a non-volatile storage element for securing incomplete transactional data remaining in cache memory. It should be appreciated that the present invention can be implemented in numerous ways, including as a process, an apparatus, or a system. Several inventive embodiments of the present invention are described below.

The alternate data path is powered by a secondary power supply that supplements power lost due to power failure. Power from the secondary power supply is sufficient to power a non-volatile storage element and a cache memory during power failure. Upon detection of power failure, the incomplete transactional data from the cache memory is moved to the non-volatile memory where the data is stored till power is restored to the computer interface board. The secondary data path establishes an alternate way to store transactional data without having to rely on chemical cell backup.

In one embodiment, a method for preventing loss of data in a computer interface board during power failure is disclosed. The method includes providing a secondary data path to a non-volatile storage element from a cache memory of the computer interface board. The cache memory of the computer interface board is a volatile memory. The secondary data path and the non-volatile storage element enable reliable memory operation during both normal and power fail modes. The method includes detecting an power failure at the computer interface board. The power failure may result in incomplete transactional data within the cache memory. Upon detection of power failure, the incomplete transactional data at the cache memory is transmitted to the non-volatile storage element through the secondary data path. The non-volatile storage element preserves the transactional data of the cache memory during power failure.

In another embodiment, a system for preventing loss of data in a computer interface board during power failure is disclosed. The system includes a secondary interface board that is configured to interface with the computer interface board. The secondary interface board includes a non-volatile storage element that is configured to receive from and store incomplete transactional data of a cache memory of the computer interface board during power failure at the computer interface board. The cache memory is volatile. The system also includes a secondary power supply configured to provide power to the non-volatile storage element and the cache memory to supplement the power lost during power failure at the computer interface board. The power supplied by the secondary power supply is sufficient to secure the transactional data in the non-volatile storage element.

In yet another embodiment, a system for preventing loss of data in a computing device during power failure is disclosed. The computing device includes a processor to process data and a cache memory for storing instructions and data used during the processing. The cache memory is a volatile memory. The system also includes recovery circuitry that is configured to interface with the cache memory of the computing device. The recovery circuitry includes a non-volatile storage element configured to receive and store in-process transactional data from the cache memory of the computing device during power failure at the computing device. A non-chemical power supply within the recovery circuitry is configured to supply power to the non-volatile storage element and the cache memory during power failure at the computing device. The power supplied by the non-chemical power supply is sufficient to transfer and store the in-process transactional data in the non-volatile storage element.

The embodiments of the invention provide an alternate mechanism to archive data during unexpected power failure. The secondary data path uses non-volatile memory to secure incomplete transactional data in the volatile cache memory that can be preserved for a longer period of time without fear of loss of data. The secondary power supply provides enough power to enable securing of the transactional data in the non-volatile memory. The current embodiments avoid the use of chemical cell to provide back-up power supply thereby avoiding issues associated with monitoring, maintenance and disposal of the chemical cell. The current embodiments provide an alternate solution for archiving data without needing to reconfigure existing structure on the computer interface board. The mechanism provides flexibility in implementation while ensuring secure transmission and protection of incomplete transactional data making this a more effective data archiving mechanism.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

Figure 1A:
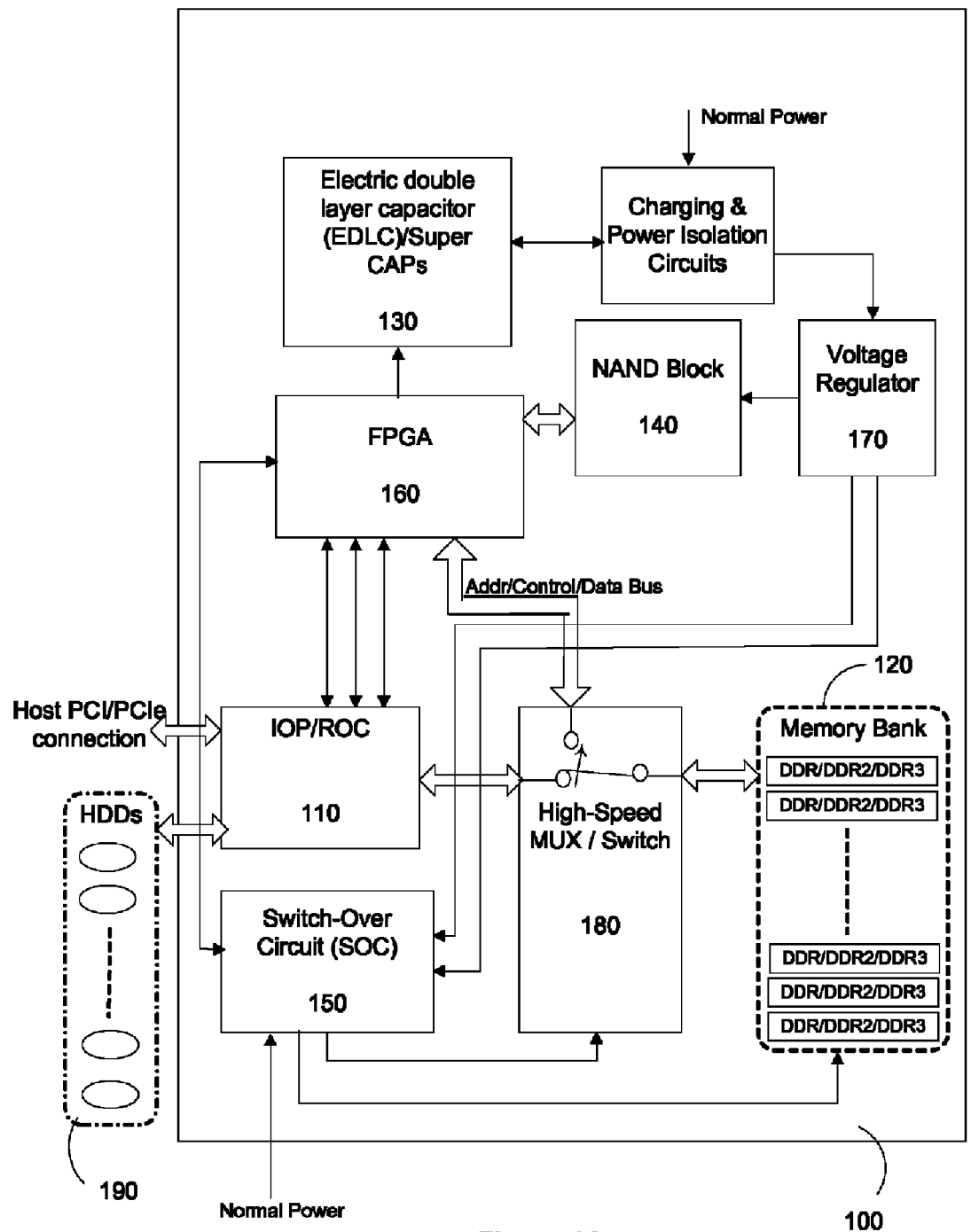
FIG. 1A illustrates a simplified block diagram of a system for preventing loss of data in a computer interface board during unexpected power failure, in one embodiment of the invention.

Several embodiments for protecting data in cache memory during unexpected power failure at a computer interface board are now described. It will be obvious, however, to one skilled in the art, that the present invention may be practiced without some or all of these specific details. In other instances, well known process operations have not been described in detail in order not to unnecessarily obscure the present invention.

Embodiments of the invention provide a secondary data path to a non-volatile storage element from cache memory of a computer interface board. An application running on a computer interface board processes data and stores the processed data in a permanent storage, such as a disk or a tape. During the execution of the application, if an unexpected power failure occurs at the computer interface board, some of the transactions or operations may not have completed and data associated with the transactions may not be completely processed. The incomplete transactional data remaining in the cache memory needs to be protected so that when power is restored to the computer interface board, the application may resume from where it was interrupted and complete the processing of the transactional data.

In order to secure the transactional data in the cache memory, a secondary data path from the cache memory to a non-volatile storage element is established. The non-volatile storage element is configured to interface with the cache memory so that data can be exchanged between the two. When an unexpected power failure is detected at the computer interface board, the secondary data path is activated using power from a secondary power supply. The secondary power supply has sufficient power to power-up key-components in the secondary data path so that any transactional data left behind in the cache memory during unexpected power failure can be secured. As a result, the secondary power supply powers the non-volatile storage element and the cache memory so that the transactional data may be moved from the volatile cache memory to a secure non-volatile storage element. Once normal power is restored to the computer interface board, the transactional data from the non-volatile storage element is copied back into cache memory so that the application to which the transactional data belong may resume operations that were interrupted by the power failure and complete processing of the transactional data. Once the transactional data is completely processed, the data may be stored in a permanent storage, such as tape, disk or solid state storage.

By moving the transactional data from volatile cache memory to the non-volatile storage element, data is secured thereby preventing loss of data. The non-volatile storage element stores the data for as long as required and can be easily retrieved once normal power is restored to the computer interface board. Additionally, the secondary data path does not require restructuring or reconfiguring of the computer interface board. The prior need for chemical cells to provide back-up power is eliminated thereby reducing maintenance and replacement costs associated with the chemical cell. The embodiments of the invention provide an effective and efficient mechanism to secure transactional data without having to deal with the overhead associated with chemical cells.

It should be noted that the non-volatile storage element may be integrated into the computer interface board or may be provided external to the computer interface board with interface to the computer interface board so that data can be easily exchanged between the cache memory and the non-volatile storage element. Providing an external non-volatile storage element helps in optimally using real-estate space on the computer interface board while providing a secure backup of transactional data.

With the above general understanding of the secondary path mechanism, different embodiments of the invention will now be described in detail with reference to the drawings.

FIG. 1A illustrates a simplified block diagram of a system that is used in securing data during an unexpected power failure at a computer interface board. The system includes a computing device in the form of a computer interface board 100 (host board), such as a computer motherboard, printed circuit board, peripheral (add-in) board or any other computer interface board. The computer interface board 100 is like any typical interface board and includes logic components, such as a processor 110 or other circuitry. The processor 110 may be an input-output processor (IOP) or RAID (Redundant Array of Independent Disks) on chip (ROC) processor, or any other processor. The processor 110 includes a plurality of logic elements, such as memory controller, XOR logic, PCI (Peripheral Component Interconnect) Express controller, etc. that are used for processing information on the host board. The computer interface board also houses a cache memory 120 in the form of Double-Data Rate Synchronous Dynamic Random Access Memory, popularly known as DDR, DDR2 or DDR3 memory. However, the above list of cache memory types is exemplary and should not be considered restrictive. As a result, any type of cache memory will work. This cache memory 120 may be configured in many ways including assembling a plurality of DRAM chips on board 100 or assembling a separate memory module popularly called as Dual In-line Memory Module (DIMM), Unbuffered DIMM or Registered DIMM or Small Outline DIMM (SODIMM). The embodiments described herein will work with all varieties of DRAM memory modules or on board discrete memory parts. The IOP/ROC, in turn, interfaces with a set of disks or tapes 190 to record and store the data processed at the computer interface board 100. In some embodiments, solid state drives may also be used, instead of hard disk drives. A memory controller logic within the processor 110 controls the workings of the cache memory 120. In addition to the aforementioned components, the computer interface board 100 may include a high-speed multiplexer/switch 180 to process the data through the cache memory. A primary data path is established from the IOP/ROC to the cache memory 120 through high-speed multiplexer 180

Figure 1B:
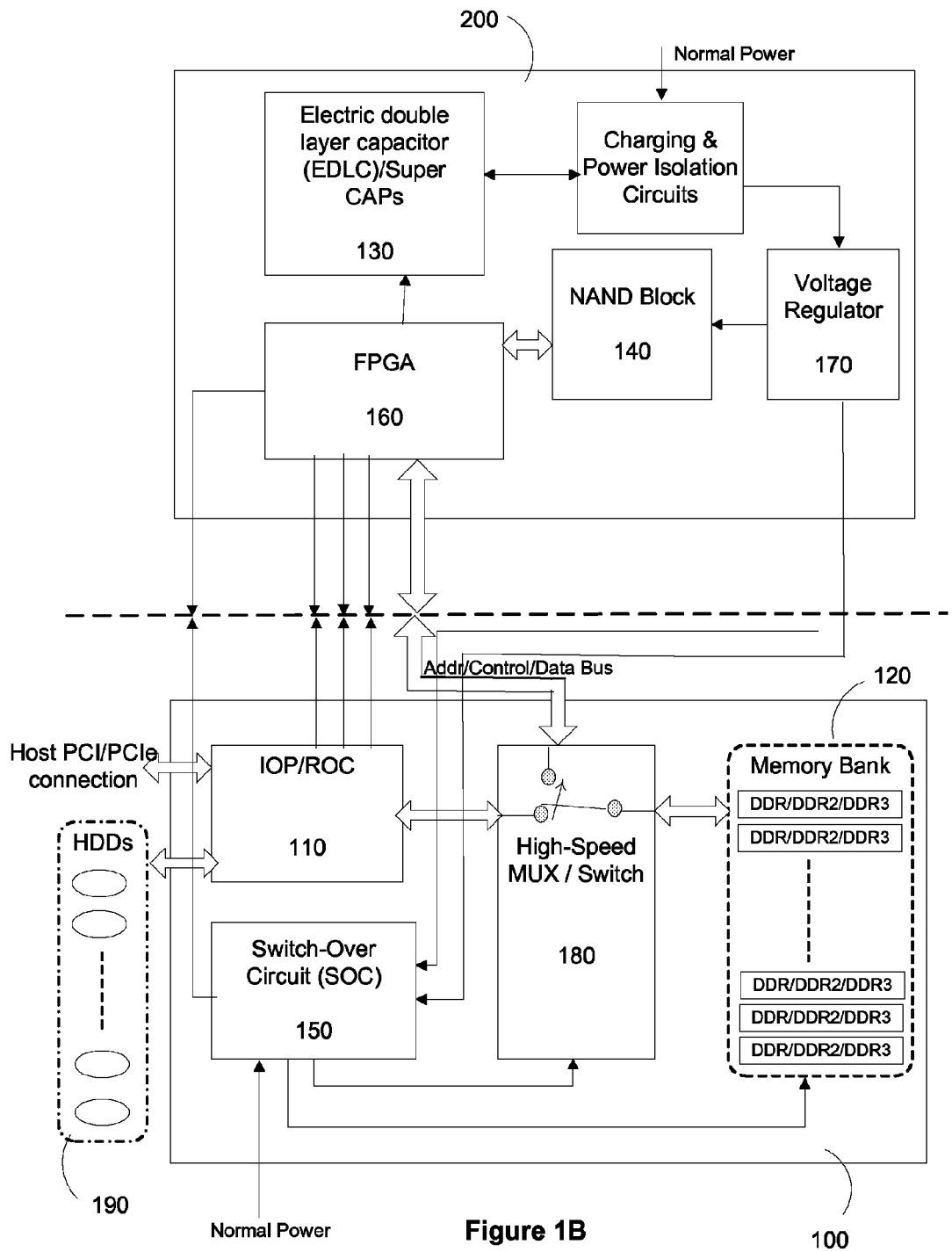
FIG. 1B illustrates an alternate embodiment of the system depicted in FIG. 1A.
Figure 1C:
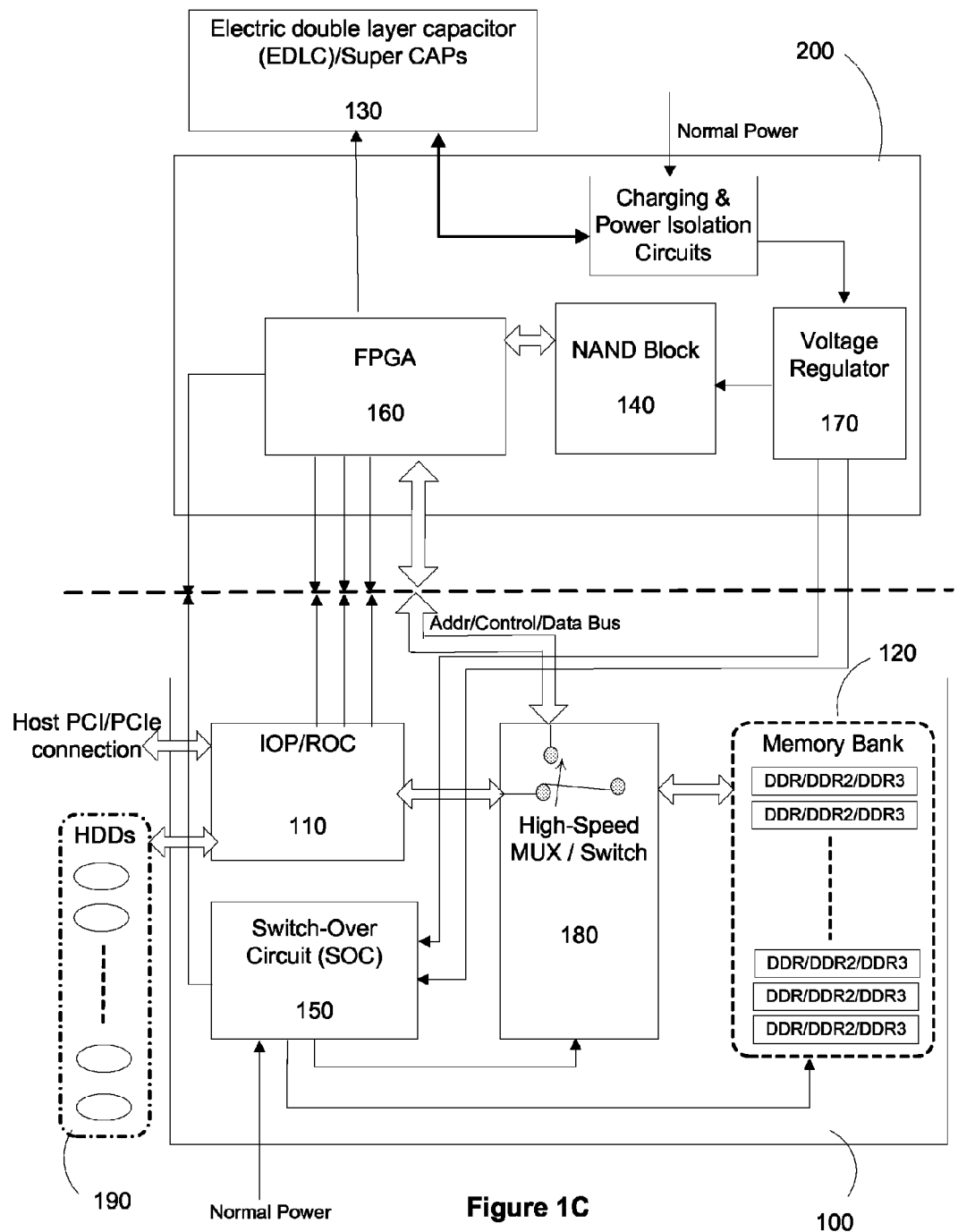
FIG. 1C illustrates an alternate embodiment of the system depicted in FIGS. 1A and 1B.

A secondary data path is defined from the cache memory 120 of the host board to a non-volatile storage element 140 through high-speed multiplexer 180 and a memory controller programmed within a Field Programmable Gate Array (FPGA). The components in the secondary data path are powered by a secondary power supply 130. One or more voltage regulators 170 and a switch-over circuit 150 may be used in conjunction with the secondary power supply 130 to regulate the voltage of the power supplied to the key components in the secondary data path. The non-volatile storage element 140 may be any type of storage element, such as NAND Flash memory, and is configured to interface with the cache memory 120 of the host board in order to exchange data between the non-volatile storage element 140 and the cache memory 120. The secondary power supply 130 in combination with one or more Voltage Regulators 170 provides power to key components, such as non-volatile storage element 140 and the cache memory 120, in the secondary data path. The secondary power supply 130 may be in the form of a super capacitor and can be located anywhere on the system. In one embodiment, the super capacitor is integrated onto the computer interface board along with the non-volatile storage element 140 and other components that make up the secondary data path. In one embodiment, the super capacitor may be located on a secondary interface board, such as a daughter board 200, on which the non-volatile storage element 140 is housed, as shown in FIG. 1B. In another embodiment, the super capacitor is located external to the daughter board 200 but provided anywhere internal to the system, as illustrated in FIG. 1C. The super capacitor interfaces with the daughter board 200 to supply power to the various key components in the daughter board 200. In one embodiment, the super capacitor 130 may be tethered to the daughter board 200 using cables. The secondary power supply (super capacitor) 130 interfaces with the computer interface board 100 to detect status of power supply at the computer interface board 100 and to obtain power during normal power-on mode of the system.

The non-volatile storage element, the memory controller within the FPGA and the secondary power supply 130, in the form of a non-chemical power supply, together form a recovery circuitry. In addition to the aforementioned key components, the recovery circuitry may also include one or more voltage regulators and optionally a charging and power isolation circuit. One or more of the key components in the recovery circuitry interface with the computer interface board to detect any power failure in the system and to supply power to the cache memory through the non-chemical power supply 130. All of the components in the recovery circuitry may be integrated within the computer interface board or may be on a secondary interface board and either plugged in or tethered using cables. Additionally, the non-chemical power supply may be provided externally and tethered to the recovery circuitry. The various configurations of the key components in the recovery circuitry have been explained above and has, therefore, not been explained in detail here.

It should be noted that the incomplete transactional data, as used in this application, refers to data that is in cache memory that is not yet been fully processed and committed to permanent memory. The in-process transactional data is data that is in-process within the system and has been written to cache memory. The incomplete transactional data and in-process transaction data are used interchangeably to refer to data not yet processed and is in cache memory and does not include data that is in the processor during power failure. It should be noted that the secondary power supply, as used in this application, is a non-chemical cell power supply.

The daughter board 200, as illustrated in FIG. 1B, may include a separate memory controller logic that interfaces with the cache memory 120 of the computer interface board 100. The memory controller of the daughter board 200 receives and holds current status information associated with the cache memory of the computer interface board 100 so as to enable the memory controller of the daughter board 200 to access and read the information in the cache memory 120. In one embodiment, the memory controller logic in the daughter board is provided in a Field Programmable Gate Array chip (FPGA) 160.

In one embodiment, the components of the daughter board 200 are incorporated within the computer interface board 100 logic circuitry, as illustrated in FIG. 1A. In this embodiment, the components of the daughter board 200 are configured to interface with the corresponding components of the computer interface board 100. In another embodiment, the components of the daughter board 200 are maintained distinct from the computer interface board and are configured to interface with the various components of the computer interface board 100 using appropriate connectors, as illustrated in FIG. 1B. In one embodiment, the connector between the computer interface board and the daughter board is a 200 pin connector.

In addition to the various components, the daughter board 200 may also include one or more voltage regulators 170 to regulate the power supplied by the super capacitor 130 to various key components on the daughter board 200 and the computer interface board 100 during an unexpected power failure. The voltage regulators include logic to enable uniform and steady supply of power to the appropriate components. A switch-over circuit (SOC) 150 may also be provided at the system to keep track of the power available at the computer interface board. The SOC 150 includes logic to detect unexpected power failure at the computer interface board, to activate the super capacitor so as to store the data in the cache memory and to detect restoration of normal power at the computer interface board so as to retrieve the data from the non-volatile storage element. In one embodiment, the SOC 150 is located on the computer interface board 100 and interfaces with the FPGA 160 to turn the super capacitor on or off. Once the super capacitor supply is turned on, the data from the cache memory is transmitted to the non-volatile storage element thereby securing the data for later use.

Figure 2:
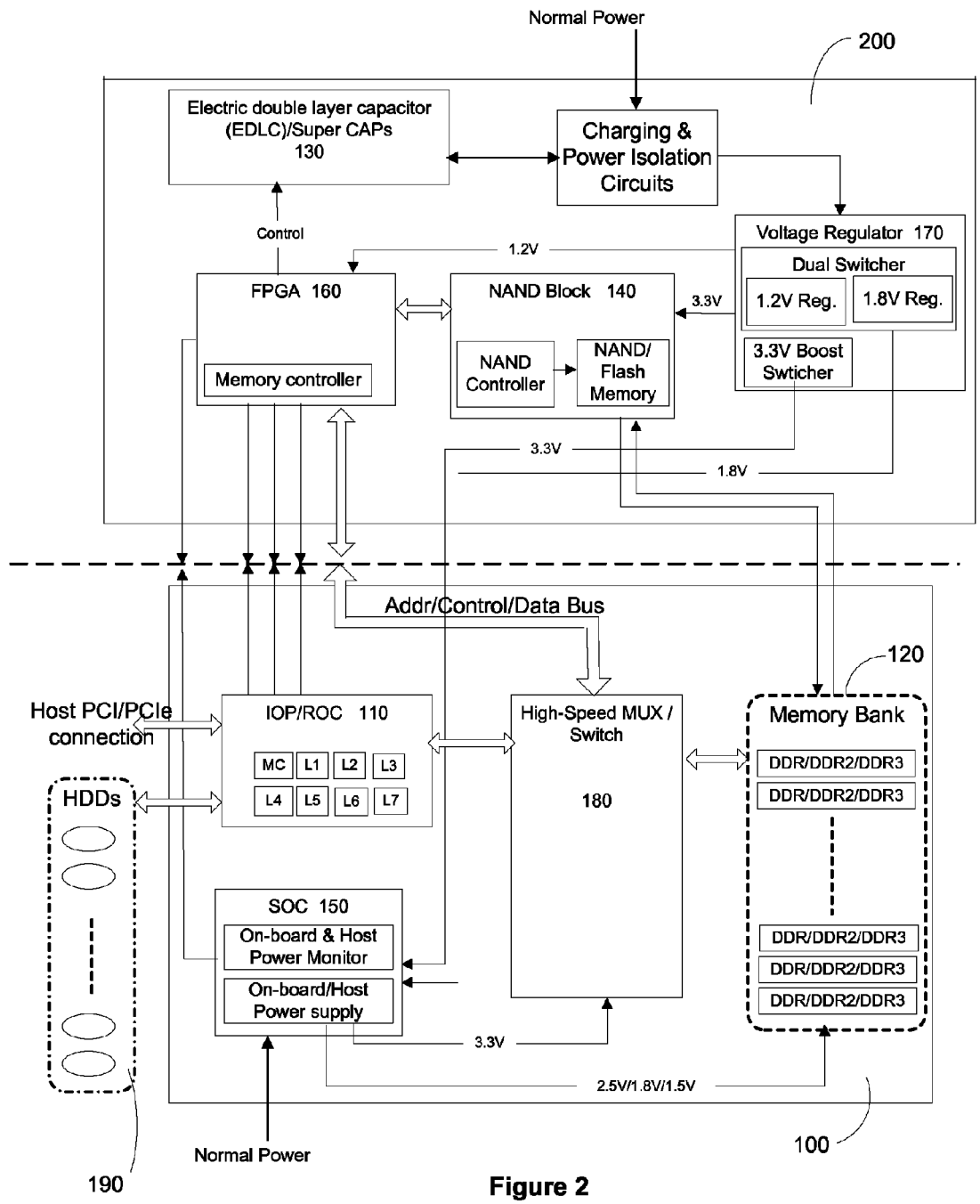
FIG. 2 illustrates a simplified block diagram of various components of a system used in securing data during unexpected power failure at a computer interface board, in one embodiment of the invention.

FIG. 2 illustrates the various component logic of a system used in securing data at a non-volatile storage element, in one embodiment of the invention. The system includes a computer interface (host) board 100 with a processor 110, such as an IOC or ROC. The processor 110 includes various logic elements, including memory controller logic MC, that are used by an application executing on the processor 110 for processing data. The MC provides the current status information of data within the cache memory 120. The cache memory 120 may be made up of a plurality of DDRs/DDR2s/DDR3s. A switch-over circuit (SOC) 150 is used to supply and monitor power at the host processor 110. An On-board Host Power supply logic and an On-board & Host Power Monitor logic in the SOC 150 are used to maintain and monitor the power supply at the host board 200, respectively. A multiplexer 180, such as High-Speed MUX/Switch is used to switch the data from primary data path to the secondary data path on the computer interface board.

A secondary interface board 200, such as a daughter board, shown in FIG. 1B is used to provide a secondary data path from the cache memory 120 to a non-volatile storage element 140. In one embodiment, the non-volatile storage element 140 includes a Flash memory that uses NAND logic. The embodiments of the invention are not restricted to a NAND Flash memory but may be extended to other types of non-volatile memory so long as the functionality of the invention is maintained. In addition to the NAND Flash memory, the non-volatile storage element includes a Flash memory controller, such as a NAND controller that includes logic to control data being written to and read from the NAND Flash memory.

A secondary power supply 130 is also provided at the daughter board 200. The secondary power supply may be a super capacitor, such as an Electric Double Layer Capacitor (EDLC). The EDLC interfaces with the SOC 150 on the host board 100 to obtain power to charge the EDLC during normal power-on mode of the host board 100. The EDLC may be integrated within the daughter board 200 or may be provided external to the daughter board 200 anywhere on the system. In the embodiment where the EDLC is provided external to the daughter board, the EDLC is tethered to the daughter board using cables. By providing the EDLC outside of the daughter board, a smaller daughter board may be used to provide the secondary data path for securing transactional data in the cache memory.

A memory controller is provided at the daughter board to obtain current status of the data in cache memory. In one embodiment the memory controller from the host is incorporated into a chip logic, such as an FPGA chip. The memory controller of the daughter board 200 interfaces with the memory controller at the IOP/ROC of the host board 100 to obtain cache memory information which is used to access and transfer the data in the cache memory during power failure and to retrieve the data from the non-volatile storage element during power restoration. Upon detection of a power failure in the host board 100, the FPGA 160 obtains power supply information and memory controller information and provides control logic to turn a backup mode of the SOC 150 on. When the backup mode of the SOC is turned on, the EDLC 130 is triggered to supply power to key components in the secondary data path, such as the NAND block 140, and the cache memory 120. In addition to the NAND block 140 and the cache memory 120, the EDLC also powers the memory controller in the FPGA 160 and the SOC 150 so that the power can be properly distributed to the key components that are used to secure the data in the cache memory. Similarly, when the power is restored at the host board 100, power supply from the EDLC 130 is turned off and the key components are powered by the power supply of the host board 100 along with other components on the host board 100. It should be noted that the EDLC 130 gets charged during the time when the system is powered by normal power supply.

The EDLC 130 may interact with a voltage regulator 170 to regulate the power supplied to the key components in the secondary data path. Towards this end, the voltage regulator 170 includes a Dual Switcher logic that includes two voltage regulator logics, 1.2V Regulator logic and 1.8V Regulator logic. In addition to the Dual switcher logic, the voltage regulator 170 includes a Boost Switcher logic to provide higher voltage, such as 3.3V, to some of the key components. The voltage regulator 170 is, thus, used to channel a steady flow of voltage to the appropriate components so that the components can function properly in securing the data in the cache memory. Different components function using different voltage of power. For instance, the FPGA may require 1.2V, the NAND block requires a 3.3V, the cache memory requires a 1.8V and the High-Speed MUX requires a 3.3V. When a power failure is detected at the host board 100, the SOC 150 is turned on to backup mode and is used to trigger the EDLC 130 to provide the voltage to power the components in the secondary data path, such as FPGA, the NAND block, the SOC and the cache memory through the voltage regulator 170. Alternately, when power is restored at the host board 100, the backup mode of the SOC is turned off and the various components in the secondary data path are powered by the power from the host board 100.

In one embodiment of the invention, the SOC 150 may use the residual power from the system to power the components. In this embodiment, once the power is out, the system slowly dies out. During the slow power down mode, the SOC 150 is used to determine the amount of residual power left in the system. If the amount of power is above a threshold limit, the SOC 150 allows the residual power from the system to power the key components before tapping on the EDLC resource. Towards this end, the SOC 150 continuously monitors the residual power in the system during power failure and uses the residual power to power the key components in the secondary data path up till a threshold value. Once the residual power is at the threshold value, the EDLC 130 is turned on and the key components are powered by the power supplied by the EDLC 130. For instance, if a system is using 12V of power and a power failure occurs in the system, the SOC 150 taps on the residual power of the system till the time the residual power hits a threshold value of, say, 5V. Upon hitting the threshold value, the SOC 150 switches the EDLC 130 on to a 'power-supply mode' so that the power from the EDLC 130 can be used to supplement the power lost due to power failure. Using the residual power and the power from the EDLC 130, data from the cache memory can be moved to the non-volatile storage element and stored till normal power is restored to the system.

It should be noted that the EDLC 130 is always on. Initially, the EDLC 130 is in a 'charge-mode' as the EDLC receives power from the system during the system's normal power-on mode and gets charged. During power failure at the system, the EDLC switches from the normal charge-mode to 'power-supply' mode. Thus, turning on or off the EDLC, in the above context, is to switch the EDLC between power-supply mode and charge mode.

Figure 3:
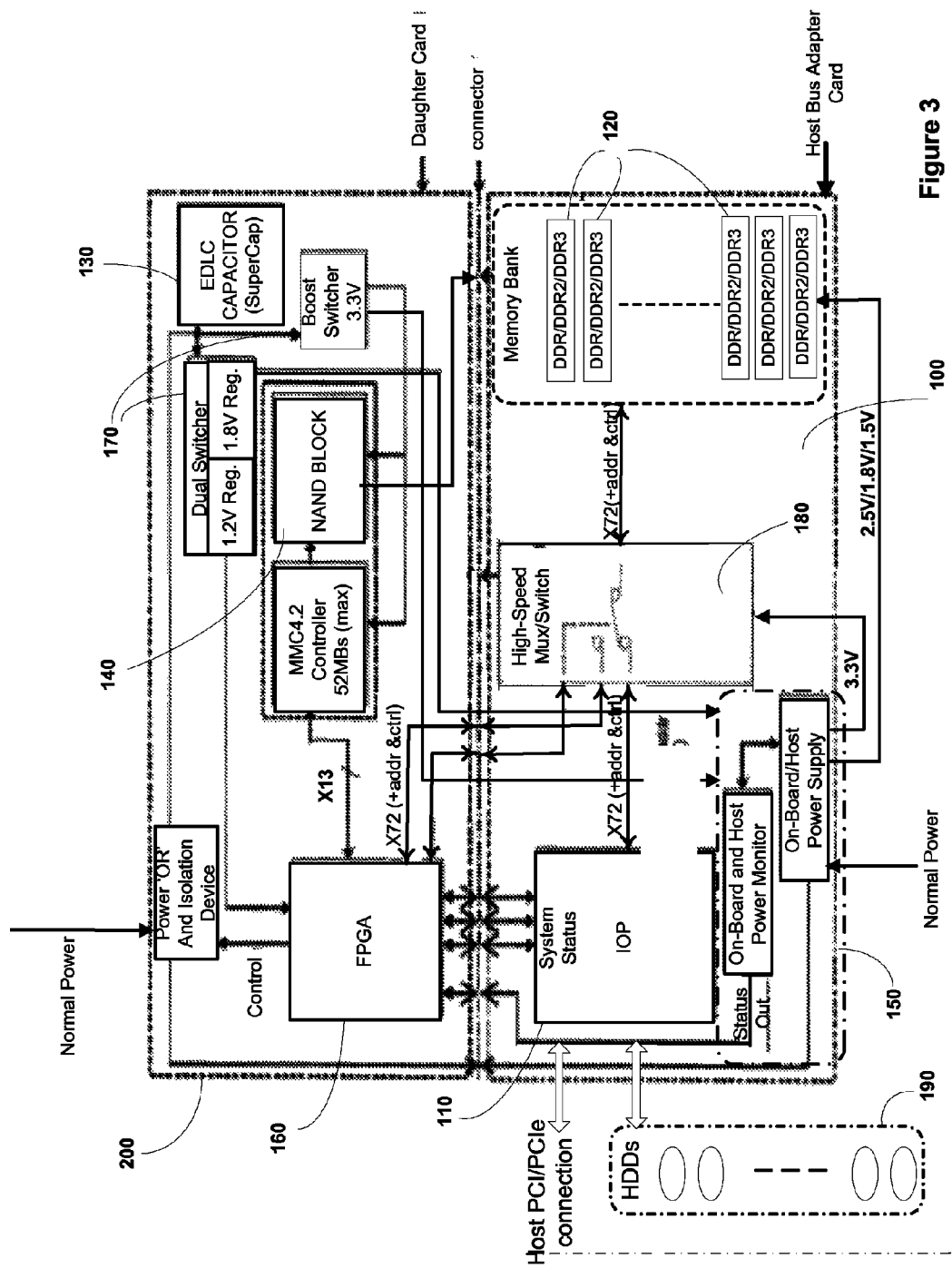
FIG. 3 illustrates a sample operational structure of a system used in preventing data loss during unexpected power failure at a computer interface board, in one embodiment of the invention.

Operational flow of data during unexpected power failure is explained with reference to FIG. 3, in one embodiment of the invention. An application processes data during the course of execution at the processor 110 on a host board 100. Data for the application is brought into cache memory 120 for processing and upon processing data is transferred to a permanent storage, such as tape or disk. A high-speed multiplexer 180 may be used to retrieve and process the data. An on-board/host power supply provides power to the various components, such as processor, multiplexer, cache memory, etc., so that the application can execute successfully. An on-board and host power monitor keeps track of the power supplied at the host board. The on-board/host power supply and on-board and host power monitor together form a switch-over circuit (SOC) 150. Status of power supply is constantly monitored and exchanged with corresponding one or more logic elements of a daughter card 200 that defines a secondary data path to the cache memory 120. The processor 110 also exchanges status of the system, including memory controller information with corresponding elements of the daughter card 200. The memory controller information provides status of data in the cache memory so that the components in the secondary data path may be able to access the data in the cache memory in the event of a power failure at the host board 100.

In the event of an unexpected power failure at the host board 100, the host power supply within the SOC 150 sends out a signal to the host power monitor indicating power failure. The host power monitor, in turn, sends out a power failure status signal in a 'Status-out' signal to the FPGA block of the daughter card 200 which houses a plurality of logic elements required for securing the data in the cache memory, including a memory controller logic and a power monitor logic. The FPGA block receives the power failure status signal and, in response, sends out a control signal to a secondary power supply 130, such as an EDLC, which switches the EDLC from a charge mode to a power-supply mode. The FPGA block checks the IOP/ROC information to determine if any unprocessed data is left behind in the cache memory and the status of such data prior to sending the control signal to turn the EDLC on to a power-supply mode. It should be noted that during normal power mode at the host board 100, the EDLC interfaces with the host power supply of the SOC 150 to obtain power and get charged. The EDLC, at this time, is said to be in a charge mode. The EDLC may interface with the host power supply through a logic element, such as Power 'OR' and Isolation Device logic.

Once the power supply mode is activated, the EDLC begins supplying power to key components in the secondary data path so that any unprocessed data in the cache memory may be secured. The key components in the secondary data path include the FPGA, a non-volatile storage element, such as a NAND flash memory block on the daughter board 200, and the cache memory and the High Speed Mux 180 on the host board 100. The high-speed MUX 180 may also be powered by the EDLC 130 so that the data can be secured. Each of the key components in the secondary data path may require a steady flow of specific amount of power in order to function efficiently. For instance, the NAND flash memory block, having a NAND block and corresponding NAND controller block, may require 3.3V in order to receive and store data, the FPGA may need 1.2V to provide access to the memory controller information and to provide control signal that controls the operation of the EDLC 130 and the cache memory may require 1.8V to transmit the data. As a result, the EDLC 130 interfaces with a regulator logic 170 in order to regulate the flow of power to each of the key components in the secondary data path. In one embodiment, the regulator logic 170 includes a 1.2V regulator logic, 1.8V regulator logic and 3.3V boost switcher logic to assist in channeling the appropriate power to each of the key components. The regulator logic 170 may interface directly with the key components or through the SOC 150 to channel the power supplied by the EDLC 130. In the embodiment illustrated in FIG. 3, the regulator logic 170 interfaces with the NAND flash memory block directly to provide 3.3V of power and with the cache memory 120 and high-speed MUX/switch 180 on the host board 100 indirectly through the SOC 150. The power from the EDLC is used to transfer any unprocessed data left behind in the cache memory 120 to the NAND Flash memory. Once the data is transferred into the non-volatile storage element, the data is secure and can be retrieved at any time when power is restored to the host board 100.

When power is restored to the host board 100, a signal from the host power supply will enable the host power monitor to detect the power at the host board 100 and will send a status signal to the FPGA 160 on the daughter board 200. The FPGA 160 receives the signal from the host board 100 and, in response, exchanges the memory controller information with the processor 110 on the host board 100 and sends a control signal to the EDLC 130 to suspend the power supplied to the key components on the secondary data path. The power to the key components on the secondary data path will now be provided by the host power supply instead of the EDLC. Upon restoration of power to all the components on the host board 100 and the key components of the daughter board, the data from the non-volatile storage element is transferred back to the cache memory 120 so that the processor 110 can resume execution of the application from where it was interrupted due to power failure. At this time, the EDLC switches from power-supply mode to charge-mode and gets charged from the host power supply.

The non-volatile storage element provides an efficient way to transfer the unprocessed transactional data left behind in the cache memory. The components in the daughter board may be integrated with the host board or may be kept distinct and connected to the host board through appropriate connectors, as illustrated in FIG. 3. Similarly, the EDLC may be integrated within the daughter board 200 or may be provided as an add-on logic element and tethered to the daughter card using connector, such as tethered cable.

In an alternate embodiment of the invention, upon detecting a power failure, the host power monitor may start monitoring the amount of residual power still left in the host board 100 while the host board is shutting down due to power failure. The host power monitor may include logic to harvest the residual power so long as the residual power is above a threshold value. The harvested power is used by the SOC to power the key components in the secondary data path in order to transfer any leftover transactional data in the cache memory. When the residual power at the host board 100 falls below a threshold value, the host power monitor sends a status signal to the FPGA 160 at the daughter board 200 requesting a secondary power supply to power the key components in order to complete securing of the data in the cache memory. Upon receiving the signal from the host power monitor, the FPGA 160 will send a request signal to the EDLC 130 to switch to power-supply mode. Upon activation of the power-supply mode, the EDLC 130 will start powering the key components in the secondary data path through the voltage regulator 170. Thus, optimal use of the power in the host and daughter boards is made to secure the unprocessed data so that data loss due to power failure is prevented.

Figure 4:
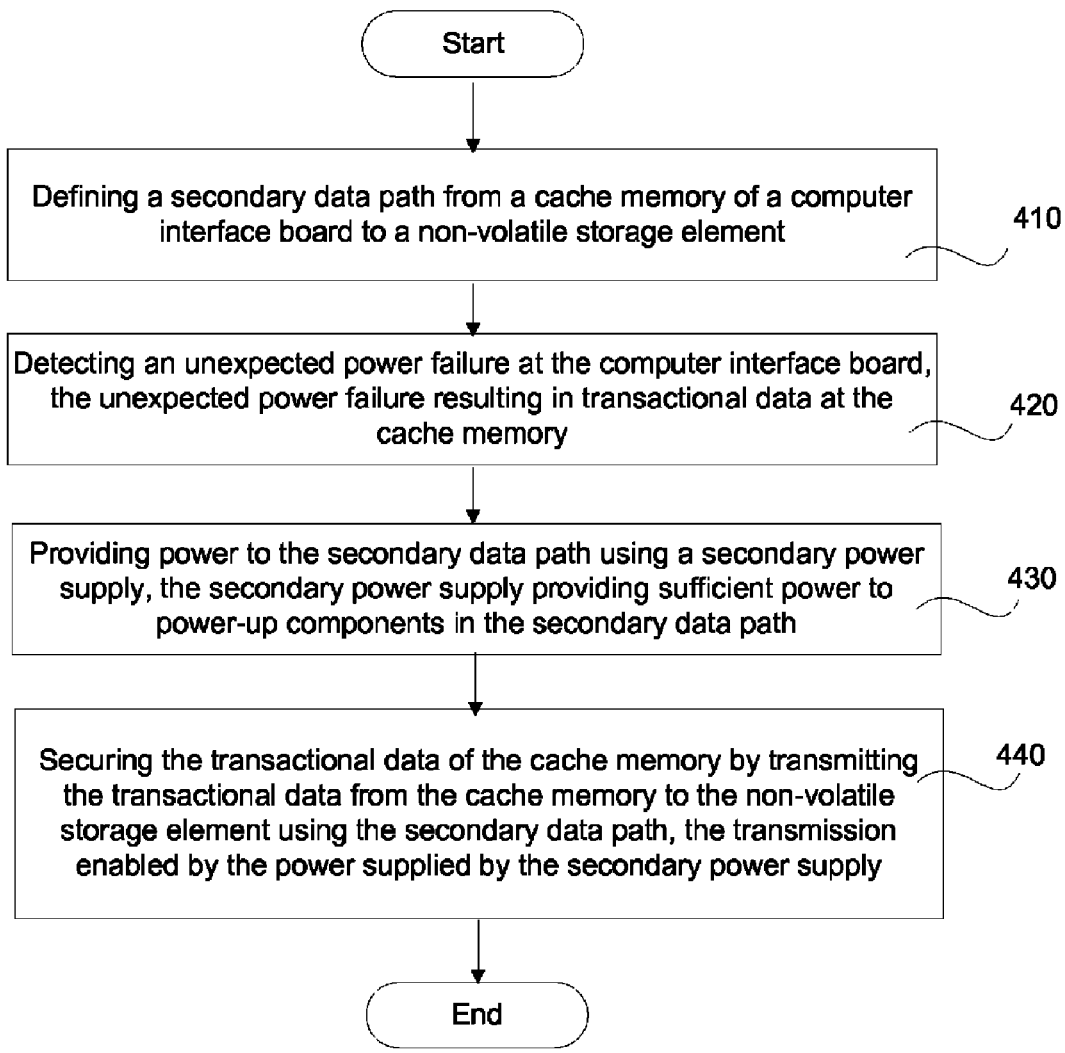
FIG. 4 illustrates a flow chart of operations for providing a secondary data path to secure transactional data of a cache memory during unexpected power loss at a computer interface board, in one embodiment of the invention.

A method for preventing loss of data in a computer interface board, such as a host board, during unexpected power failure will now be described with reference to FIG. 4. FIG. 4 illustrates the various process flow operation involved in securing unprocessed data at the cache memory in the event of a power loss at the computer interface board. The method begins at operation 410 wherein a secondary data path is defined from a cache memory of the computer interface board to a non-volatile storage element. The cache memory is volatile and is, therefore, susceptible to lose the unprocessed data during power failure if the data is not transferred promptly. An unexpected power failure at the computer interface board is detected using a host power monitor, as illustrated in operation 420. The unexpected power failure may cause an application executing at the computer interface board to terminate unexpectedly leaving behind unprocessed data in the cache memory. The unprocessed data needs to be transferred so that data loss can be prevented. A secondary power supply is provided at the secondary data path so as to power a plurality of key components in the secondary data path, as illustrated in operation 430. The transactional data in the cache memory left behind by an application is transferred to the non-volatile memory using the power supplied by the secondary power supply, as illustrated in operation 440. The secondary power supply provides sufficient power to power the key components so that the data can be easily transmitted from the cache memory to the non-volatile storage element. Once the data is transferred to the non-volatile storage element, the data can be retrieved at any time without fear of loss of data.

Eventually, when normal power is restored at the computer interface board, the power to the key components in the secondary data path is switched from secondary power supply to the normal power supply. Upon restoration of power, the data from the non-volatile storage element is transferred back to the cache memory so that the application that was executing on the computer interface board when the power failure occurred may resume operation at the point where it was interrupted and the data can be processed. The processed data may then be stored in a permanent storage device, such as disks or tapes.

The embodiments of the invention provide an effective way of securing data without fear of losing data. The non-volatile storage element holds the data over an extended period of time so that data can be easily retrieved. The current embodiments have no overhead associated with conventional architecture which uses chemical cell making this a more reliable, efficient and effective architecture for securing data during unexpected power failure. Additionally, the embodiments can be implemented without much restructuring or reconfiguring of the computer interface board architecture making this a more reliable and easy architecture. Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. Additionally, the computer readable code comprising the present invention may be stored on multiple computer readable medium devices distributed over a network of coupled computer systems so that the computer readable code is stored and executed in a distributed fashion.

While this invention has been described in terms of several preferred embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for preventing loss of data in a computer interface board during power failure, comprising:
   providing a secondary data path to a non-volatile storage element from a cache memory on the computer interface board, the cache memory of the computer interface board being a volatile memory, the secondary data path and the non-volatile storage element enabling reliable memory operation during both normal and power fail modes;
   providing a secondary power supply to the non-volatile memory and the cache memory in the secondary data path, wherein the secondary power supply is a non-chemical cell power source;
   detecting an unexpected power failure at the computer interface board, the unexpected power failure resulting in incomplete transactional data within the cache memory;
   verifying, in response to the unexpected power failure, if any incomplete transactional data is left behind in the cache memory, wherein when incomplete transactional data is left behind in the cache memory, the verifying further includes,
      (a) verifying status of the incomplete transactional data in the cache memory;
      (b) activating the secondary power supply to supply power to the secondary data path; and
      (c) transmitting the incomplete transactional data from the cache memory to the non-volatile storage element through the secondary data path, the non-volatile storage element preserving the transactional data of the cache memory during power failure,
   wherein the secondary power supply provides sufficient power to supplement power lost due to power failure so as to transfer the incomplete transactional data to the non-volatile memory.

2. The method of claim 1, wherein providing the secondary data path further includes,
   harvesting residual power at the computer interface board during a power failure up till a threshold value; and
   switching to the secondary power supply when the residual power has crossed the threshold value.

3. The method of claim 1, further includes controlling the turning on or off of the secondary power supply so as to enable or disable power supply to the non-volatile memory and the cache memory in the secondary data path based on a status of the power supply at the computer interface board.

4. The method of claim 2, wherein the secondary power supply is provided by a capacitor.

5. The method of claim 1, wherein transmitting the incomplete transactional data further includes controlling a recording of the incomplete transactional data at the non-volatile storage element so as to ensure complete securing of the incomplete transactional data.

6. The method of claim 1, further includes,
   detecting resumption of normal power at the computer interface board; and transmitting the transactional data from the non-volatile memory through the secondary data path to the cache memory at the computer interface board.

7. A system for preventing loss of data in a computer interface board during power failure, comprising:
a secondary interface board configured to interface with the computer interface board, comprising,
a non-volatile storage element configured to receive and store incomplete transactional data from a cache memory of the computer interface board during power failure at the computer interface board, wherein the cache memory is volatile; and
a secondary power supply configured to supplement power to the non-volatile storage element and the cache memory during power failure at the computer interface board such that the power supplied by the secondary power supply is sufficient to secure the incomplete transactional data in the non-volatile storage element,
wherein the non-volatile storage element includes one or more logic elements to,
(a) detect unexpected power failure at the computer interface board;
(b) determine if any incomplete transactional data is left behind in the cache memory of the computer interface board;
(c) when incomplete transactional data is left behind, activate the secondary power supply to supply power to the non-volatile storage element and the cache memory;
(d) transmit the incomplete transactional data from the cache memory to the non-volatile storage element through a secondary data path, the non-volatile storage element preserving the incomplete transactional data of the cache memory during power failure.

8. The system of claim 7, wherein the secondary power supply is a capacitor, the capacitor interfacing with the computer interface board to obtain power from the computer interface board during a normal charge mode and to supply power to the non-volatile storage element on the secondary interface board and the cache memory on the computer interface board in order to secure transactional data in the cache memory during a power supply mode when a power failure is detected at the computer interface board.

9. The system of claim 8, wherein the capacitor is integrated within the secondary interface board.

10. The system of claim 8, wherein the capacitor is distinct from the secondary interface board and is tethered to the secondary interface board using external cables.

11. The system of claim 7, further includes a switchover circuit logic, the switchover circuit logic configured to detect status of power supply at the computer interface board and to enable or disable the secondary power supply based on the status of the power supply at the computer interface board.

12. The system of claim 11, wherein the secondary interface board further includes a voltage regulator, the voltage regulator configured to interface with the secondary power supply to regulate amount of power supplied by the secondary power supply to the cache memory, the non-volatile storage element and to one or more components on the computer interface board and the secondary interface board.

13. The system of claim 12, wherein the secondary interface board further includes a memory controller, the memory controller on the secondary interface card configured to interface with a memory controller of the computer interface board to determine status of power supply at the computer interface board and the status of transactional data within the cache memory.

14. The system of claim 8, wherein the secondary interface board is an add-on card with interface to the computer interface board.

15. The system of claim 8, wherein the secondary interface board is integrated into the computer interface board.

16. A system for preventing loss of data in a computing device during unexpected power failure, comprising:
the computing device having,
a processor to process data;
a cache memory for storing instructions and data used during processing of the data at the computing device, the cache memory being a volatile memory; and
a recovery circuitry configured to interface with the cache memory of the computing device, the recovery circuitry including,
a non-volatile storage element configured to receive and secure incomplete transactional data from the cache memory of the computing device during power failure at the computing device; and
a secondary power supply configured to supplement power to the non-volatile storage element and the cache memory during power failure at the computing device such that the power supplied by the secondary power supply is sufficient to secure the incomplete transactional data in the non-volatile storage element,
wherein the non-volatile storage element includes one or more logic elements to,
(a) detect unexpected power failure at the computer interface board;
(b) determine if any incomplete transactional data is left behind in the cache memory of the computer interface board;
(c) when incomplete transactional data is left behind, activate the secondary power supply to supply power to the non-volatile storage element and the cache memory;
(d) transmit the incomplete transactional data from the cache memory to the non-volatile storage element through a secondary data path, the non-volatile storage element preserving the incomplete transactional data of the cache memory during power failure.

17. The system of claim 16, wherein the computing system is one of a system mother board, interface card board, a printed circuit board or a plug-in interface card board.

18. The system of claim 17, wherein the recovery circuitry is integrated on to any one of the system mother board, interface card board, printed circuit board or a plug-in interface card board.

19. The system of claim 17, wherein the recovery circuitry is integrated onto a secondary interface board that is plugged into any one of the system mother board, interface card board, a printed circuit board or a plug-in interface card board.

20. The system of claim 17, wherein the recovery circuitry is tethered to one of the system mother board, interface card board, a printed circuit board or a plug-in interface card board using cables.

* * * * *